United States Patent
Ota

(10) Patent No.: US 12,224,850 B2
(45) Date of Patent: Feb. 11, 2025

(54) MONITORING APPARATUS, MONITORING METHOD, AND NON-TRANSITORY COMPUTER-READABLE MEDIUM CONTAINING PROGRAM

(71) Applicant: NEC Corporation, Tokyo (JP)

(72) Inventor: Morihiko Ota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 17/913,015

(22) PCT Filed: Mar. 16, 2021

(86) PCT No.: PCT/JP2021/010514
§ 371 (c)(1),
(2) Date: Sep. 20, 2022

(87) PCT Pub. No.: WO2021/200097
PCT Pub. Date: Oct. 7, 2021

(65) Prior Publication Data
US 2023/0145196 A1    May 11, 2023

(30) Foreign Application Priority Data
Mar. 30, 2020  (JP) ................................ 2020-059470

(51) Int. Cl.
*H04J 14/02*    (2006.01)
*H04B 10/079*  (2013.01)

(52) U.S. Cl.
CPC ............ *H04J 14/02* (2013.01); *H04B 10/079* (2013.01)

(58) Field of Classification Search
CPC .............................. H04J 14/02; H04B 10/079
See application file for complete search history.

(56) References Cited

U.S. PATENT DOCUMENTS

| | | | |
|---|---|---|---|
| 7,558,479 B1 * | 7/2009 | Robinson ........... | H04B 10/2543 398/16 |
| 2008/0124078 A1 | 5/2008 | Fukashiro | |
| 2010/0202773 A1 | 8/2010 | Lee et al. | |

(Continued)

FOREIGN PATENT DOCUMENTS

| | | |
|---|---|---|
| JP | 2003-043429 A | 2/2003 |
| JP | 2008-136011 A | 6/2008 |
| WO | 2017/033223 A1 | 3/2017 |

OTHER PUBLICATIONS

International Search Report for PCT Application No. PCT/JP2021/010514, mailed on Jun. 15, 2021.

*Primary Examiner* — Pranesh K Barua

(57) ABSTRACT

Provided is a monitoring apparatus capable of efficiently optimizing the transmission efficiency of an entire network. The monitoring apparatus (1) includes a variable parameter changing unit (2), a monitoring information acquisition unit (4), and an estimation unit (6). The variable parameter changing unit (2) changes a variable parameter for at least one of multiple network apparatuses that constitute an optical communication network transmitting an optical signal by wavelength division multiplexing. The monitoring information acquisition unit (4) acquires monitoring information related to a state of optical communication from at least one of the multiple network apparatuses. The estimation unit (6) estimates at least one penalty for a receiving side, using the monitoring information.

14 Claims, 13 Drawing Sheets

(56) References Cited

U.S. PATENT DOCUMENTS

| | | | |
|---|---|---|---|
| 2012/0148234 A1* | 6/2012 | Bellagamba | H04J 14/0269 398/28 |
| 2013/0004162 A1* | 1/2013 | Osaka | H04J 14/02 398/25 |
| 2013/0004165 A1* | 1/2013 | Mun | H04J 14/0258 398/34 |
| 2017/0244481 A1* | 8/2017 | Seve | H04B 10/2543 |
| 2018/0198521 A1* | 7/2018 | Satou | H04J 14/00 |

* cited by examiner

MONITORING APPARATUS, MONITORING METHOD, AND NON-TRANSITORY COMPUTER-READABLE MEDIUM CONTAINING PROGRAM

This application is a National Stage Entry of PCT/JP2021/010514 filed on Mar. 16, 2021, which claims priority from Japanese Patent Application 2020-059470 filed on Mar. 30, 2020, the contents of all of which are incorporated herein by reference, in their entirety.

TECHNICAL FIELD

The present invention relates to a monitoring apparatus, a monitoring method, and a non-transitory computer-readable medium containing a program, in particular, to a monitoring apparatus, a monitoring method, and a non-transitory computer-readable medium containing a program, for monitoring a network.

BACKGROUND ART

As optical communication traffic is expected to increase dramatically in the future, it is desirable to achieve high throughput using limited optical fiber resources. In order to increase the capacity of optical communication networks, wavelength division multiplexing (WDM) communication schemes are being developed. In relation with this technology, for example, Patent Literature 1 discloses a mutual phase modulation all-optical wavelength converter that sets optimal operating conditions for drive current, signal optical power, and continuous optical power. The technology in Patent Document 1 makes it possible to reduce the current to be supplied.

CITATION LIST

Patent Literature

Patent Literature 1: Japanese Unexamined Patent Application Publication No. 2003-43429

SUMMARY OF INVENTION

Technical Problem

To achieve high throughput in optical communication, it is desirable to optimize the transmission efficiency of the entire network, for example, transmission capacity. However, the technology described in Patent Literature 1 only discloses setting optimal operating conditions for the drive current, signal optical power, and continuous optical power of a discrete device, such as a mutual phase modulation all-optical wavelength converter. It is therefore difficult to optimize the transmission efficiency of the entire network with the technology described in Patent Literature 1.

An object of the present disclosure is to solve such problems and to provide a monitoring apparatus, a monitoring method, and a program that can efficiently optimize the transmission efficiency of the entire network.

Solution to Problem

A monitoring apparatus according to the present disclosure includes: variable parameter changing means for changing a variable parameter that is related to a characteristic of optical communication and is changeable for at least one of multiple network apparatuses that constitute an optical communication network transmitting optical signals by wavelength division multiplexing; monitoring information acquisition means for acquiring at least one piece of monitoring information related to a state of optical communication from at least one of the multiple network apparatuses; and estimation means for estimating at least one penalty for a receiving side, using the monitoring information.

A monitoring method according to the present disclosure including: changing a variable parameter that is related to a characteristic of optical communication and is changeable for at least one of multiple network apparatuses that constitute an optical communication network transmitting optical signals by wavelength division multiplexing; acquiring at least one piece of monitoring information related to a state of optical communication from at least one of the multiple network apparatuses; and estimating at least one penalty for a receiving side, using the monitoring information.

A program according to the present disclosure causes a computer to perform the steps of: changing a variable parameter that is related to a characteristic of optical communication and is changeable for at least one of multiple network apparatuses that constitute an optical communication network transmitting optical signals by wavelength division multiplexing; acquiring at least one piece of monitoring information related to a state of optical communication from at least one of the multiple network apparatuses; and estimating at least one penalty for a receiving side, using the monitoring information.

Advantageous Effects of Invention

The present disclosure provides a monitoring apparatus, a monitoring method, and a program that can efficiently optimize the transmission efficiency of the entire network.

EXAMPLE EMBODIMENT

Summary of Example Embodiment of Present Disclosure

Figure 1:
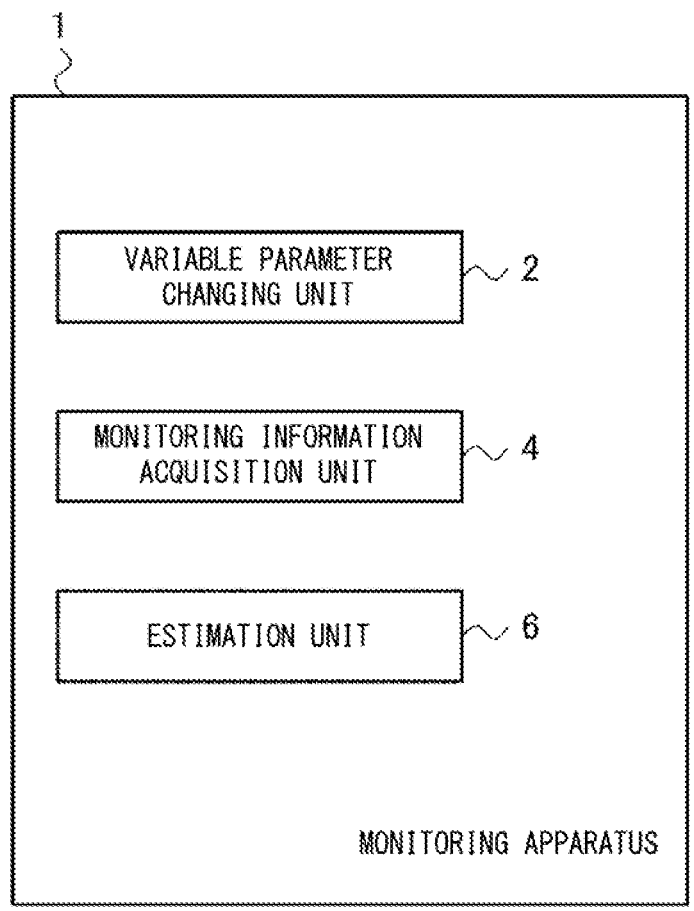
FIG. 1 is a diagram showing an overview of a monitoring apparatus according to an example embodiment of the present disclosure.
Figure 2:
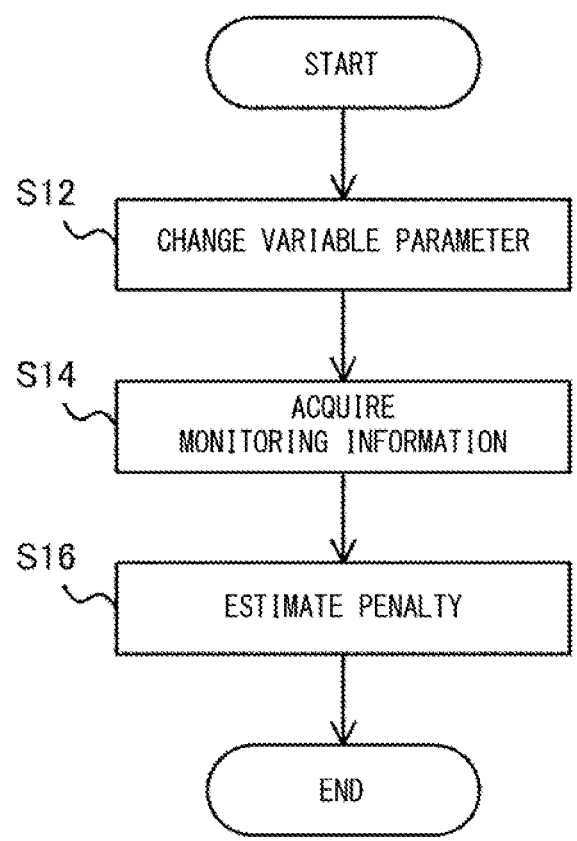
FIG. 2 is a flowchart showing a monitoring method executed in the monitoring apparatus according to an example embodiment of the present disclosure.

Prior to the description of the example embodiments of the present disclosure, an overview of the example embodiments of the present disclosure will be given. FIG. 1 is a diagram showing an overview of a monitoring apparatus 1 according to an example embodiment of the present disclosure. FIG. 2 is a flowchart showing a monitoring method executed in the monitoring apparatus 1 according to an example embodiment of the present disclosure.

The monitoring apparatus 1 is, for example, a computer. The monitoring apparatus 1 includes a variable parameter changing unit 2, a monitoring information acquisition unit 4, and an estimation unit 6. The variable parameter changing unit 2 functions as a variable parameter changing means. The monitoring information acquisition unit 4 functions as a monitoring information acquisition means. The estimation unit 6 functions as an estimation means.

The variable parameter changing unit 2 changes the variable parameters (Step S12). To be specific, the variable parameter changing unit 2 changes the variable parameters for at least one of the multiple network apparatuses that constitute the optical communication network transmitting optical signals by wavelength division multiplexing. Here, "variable parameters" are variable parameters related to the characteristics of optical communication. Specific examples of network apparatuses and variable parameters will be described below.

The monitoring information acquisition unit 4 acquires monitoring information (Step S14). To be specific, the monitoring information acquisition unit 4 acquires monitoring information from at least one of the multiple network apparatuses. Here, "monitoring information" is information (monitoring parameters) related to the state (e.g., quality) of optical communication. Note that the monitoring information can be changed in accordance with changes in the variable parameters. However, the monitoring information does not necessarily have to be changed in accordance with changes in the variable parameters. Specific examples of monitoring information will be described below.

The estimation unit 6 estimates at least one penalty for the receiving side (Step S16). To be specific, the estimation unit 6 estimates the penalty using the monitoring information acquired in the processing of S14. Here, "penalty" is a value indicating the degree (amount of degradation) of elements (noise; distortion) that cause degradation of transmission quality for the receiving side, which is caused by the transmission status of optical signals. Specific examples of penalty will be described below.

The monitoring apparatus 1 according to this example embodiment is configured to acquire monitoring information by changing the variable parameters and to estimate the penalty using the acquired monitoring information. With this configuration, the monitoring apparatus 1 according to this example embodiment can acquire monitoring information under various conditions by changing the variable parameters. Consequently, the monitoring apparatus 1 according to this example embodiment can accurately estimate penalties. Consequently, the monitoring apparatus 1 according to this example embodiment can efficiently optimize the transmission efficiency of the entire network by using the accurately estimated penalty.

One method to improve transmission efficiency, such as transmission capacity, is to change the transmission scheme from the first transmission scheme to the second transmission scheme that has transmission efficiency improved from that of the first transmission scheme. Examples include changing the modulation scheme to increase the modulation level (i.e., modulation multi-values, or M-ary values), and reducing the redundancy in forward error correction (FEC) (lowering the correction capability). However, in general, when transmission efficiency such as transmission capacity is improved by these methods, higher communication quality is required to avoid communication errors. The required communication quality can be determined by the penalty. Therefore, the necessary communication quality can be calculated (estimated) with high accuracy so that it conforms to the actual situation by estimating the penalty with high accuracy, and thereby it can be efficiently determined whether the transmission efficiency of the entire network can be improved or not. Accordingly, the transmission efficiency of the entire network can be efficiently optimized by using the accurately estimated penalty.

Note that the transmission efficiency of the entire network can also be efficiently optimized by the monitoring method executed in the monitoring apparatus 1 and the program that executes the monitoring method. The transmission efficiency of the entire network can also be efficiently optimized by using a monitoring system including the monitoring apparatus 1.

First Example Embodiment

The example embodiments will be described below with reference to the drawings. For the sake of clarity of explanation, the following descriptions and drawings are abbreviated or simplified as appropriate. In each drawing, identical elements are denoted by the same reference numeral, and duplicate explanations are omitted as needed.

Figure 3:
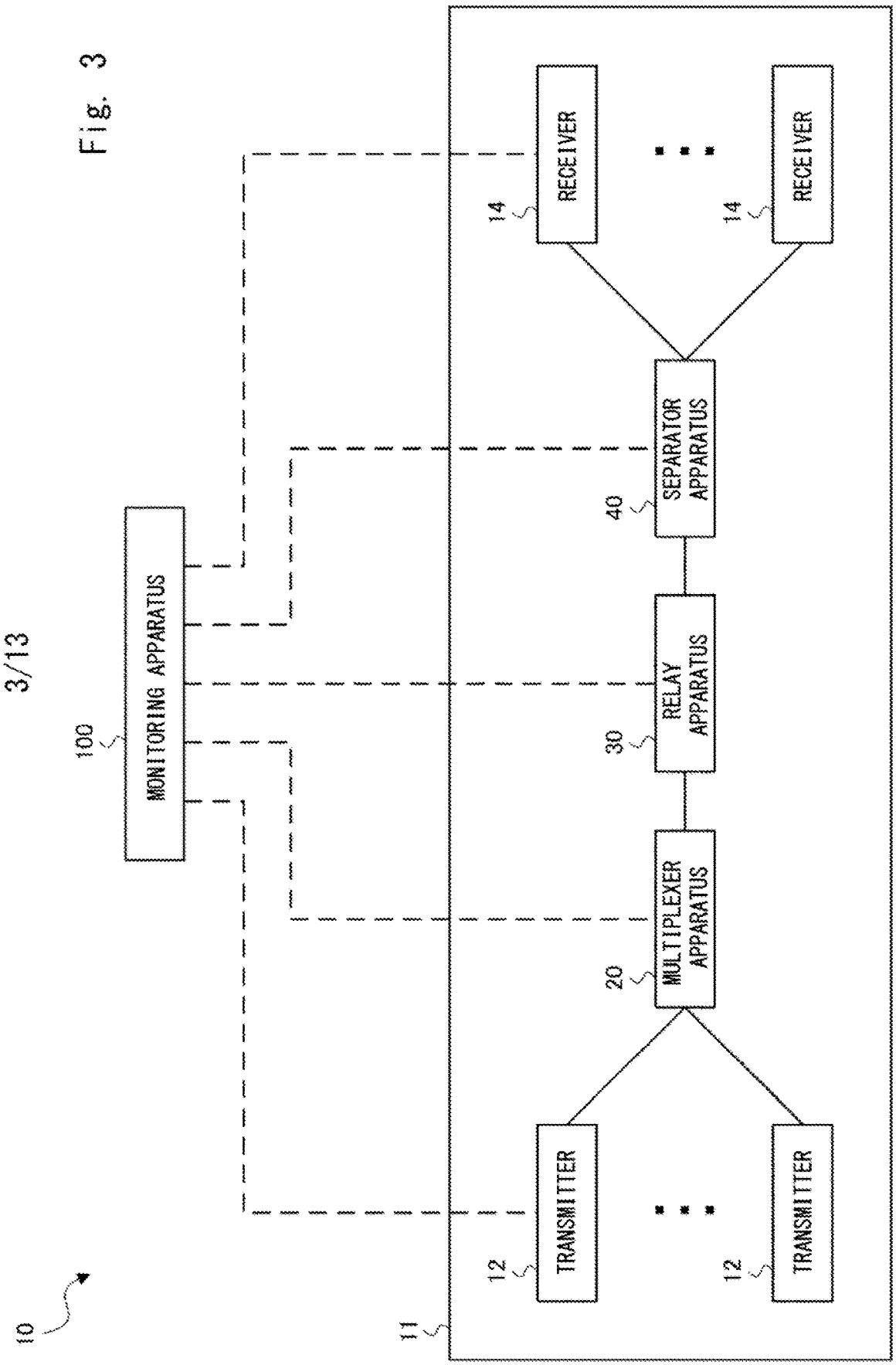
FIG. 3 is a diagram showing the configuration of a monitoring system according to a first example embodiment.

FIG. 3 is a diagram showing the configuration of a monitoring system 10 according to the first example embodiment. The monitoring system 10 includes an optical communication network 11 and a monitoring apparatus 100. The monitoring apparatus 100 monitors the optical communication network 11 and the network apparatuses in the optical communication network 11. The monitoring apparatus 100 changes the variable parameters in the network apparatuses. The monitoring apparatus 100 acquires monitoring information from the network apparatuses. The monitoring apparatus 100 estimates penalties, using the monitoring information.

The optical communication network 11 transmits optical signals by wavelength division multiplexing (WDM). The optical communication network 11 includes, as the network apparatuses, multiple transmitters 12, multiple receivers 14, a multiplexer apparatus 20, a relay apparatus 30, and a separator apparatus 40. The multiple transmitters 12 are connected to the multiplexer apparatus 20. The multiple receivers 14 are connected to the separator apparatus 40. The multiplexer apparatus 20 and the separator apparatus 40 are connected via the relay apparatus 30. In addition, optical transmission lines, such as optical fibers, are provided between the multiplexer apparatus 20 and the relay apparatus 30, and between the relay apparatus 30 and the separator apparatus 40. Note that the number of relay apparatuses 30 is arbitrary. As described below, due to control by reconfigurable optical add and drop multiplexing (ROADM), the nodes of the multiplexer apparatus 20, relay apparatus 30, and separator apparatus 40 may function as the multiplexer apparatus 20, relay apparatus 30, and separator apparatus 40, respectively.

Upon reception of a predetermined wavelength channel transmitted from multiple transmitters 12, the multiplexer apparatus 20 inserts the wavelength channel to WDM signal light and applies multiplexing to it. The multiplexer apparatus 20 then outputs the acquired optical signals to the relay apparatus 30 in the following stage. The relay apparatus 30 performs signal processing, such as optical amplification, on the optical signals from the multiplexer apparatus 20, and outputs the optical signals to the separator apparatus 40 in the following stage. Upon reception of optical signals from the relay apparatus 30, the separator apparatus 40 performs wavelength separation processing on the optical signals. Consequently, the separator apparatus 40 separates a predetermined wavelength channel and transmits these to the receivers 14.

Figure 4:
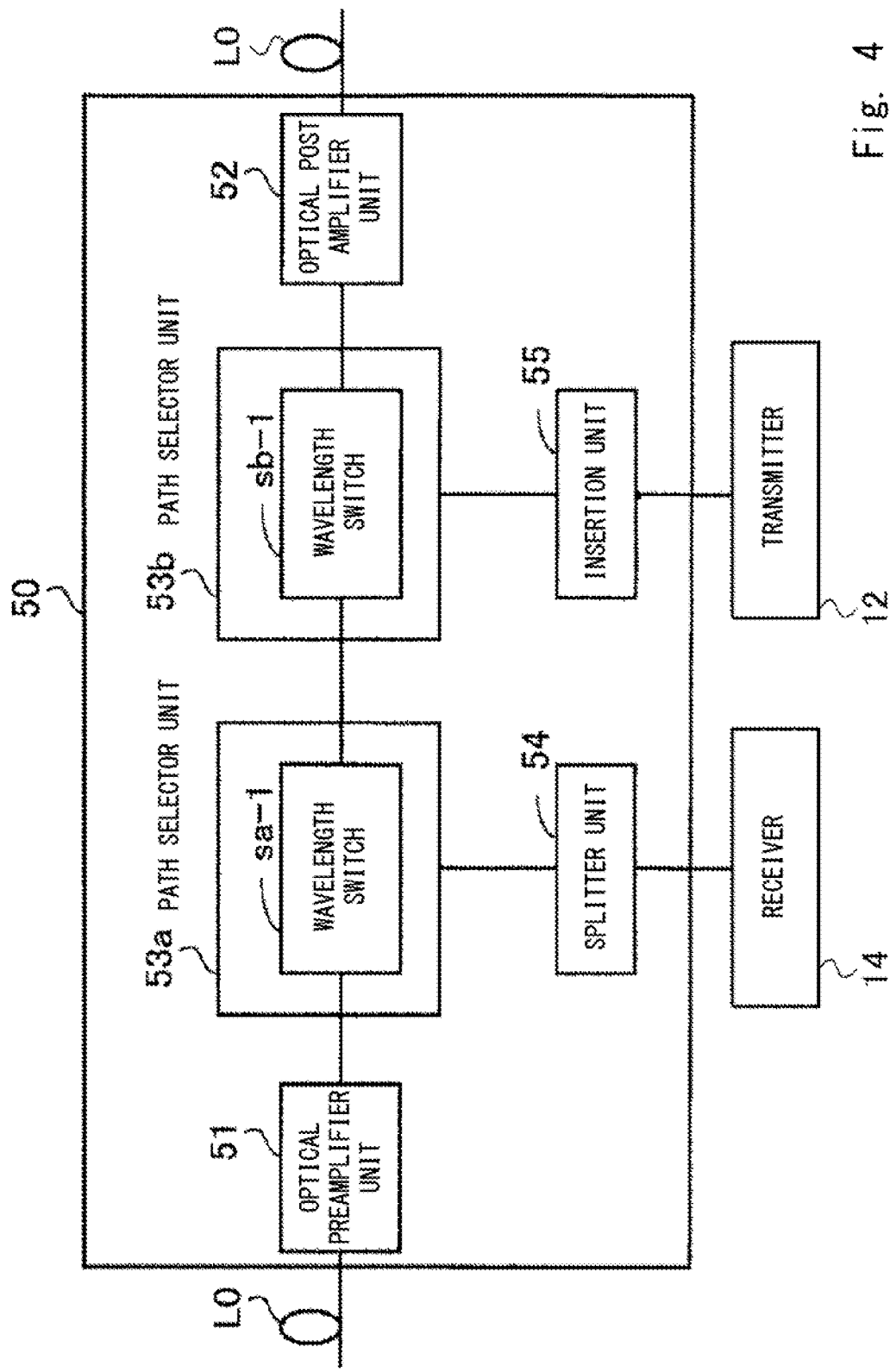
FIG. 4 is a diagram illustrating the configuration of a node corresponding to the multiplexer apparatus, relay apparatus, and separator apparatus shown in FIG. 3.

FIG. 4 is a diagram illustrating the configuration of a node 50 corresponding to the multiplexer apparatus 20, relay apparatus 30, and separator apparatus 40 shown in FIG. 3. The node 50 is a network apparatus. The node 50 is a ROADM. The node 50 includes an optical preamplifier unit 51 (preamplifier), an optical post amplifier unit 52 (post amplifier), path selector units 53a and 53b, a splitter unit 54, and an insertion unit 55. Also, a transmitter 12 and a receiver 14 are connected to the node 50. Here, the insertion unit 55, the path selector unit 53b, and the optical post amplifier unit 52 can constitute a multiplexer apparatus 20. In addition, the optical preamplifier unit 51, the path selector unit 53a, and the splitter unit 54 can constitute the separator apparatus 40. Also, the optical preamplifier unit 51, the path selector units 53a and 53b, and the optical post amplifier unit 52 can constitute the relay apparatus 30. The relay apparatus 30 does not necessarily have the path selector units 53a and 53b and may be composed of the optical preamplifier unit 51 and the optical post amplifier unit 52.

The optical preamplifier unit 51 receives WDM signal light that has passed through an optical fiber L0 and performs optical amplification. The path selector unit 53a includes a wavelength switch sa-1. The path selector unit 53b includes a wavelength switch sb-1. A wavelength selective switch (WSS), for example, is used as the wavelength switch. The path selector unit 53 is, for example, an optical cross-connect.

The path selector unit 53a performs wavelength separation of the wavelength of the received WDM signal light and switches the wavelength channel. The path selector unit 53b receives the wavelength channel output from the path selector unit 53a and wavelength-multiplexes it. The optical post amplifier unit 52 optically amplifies the output of the path selector unit 53b and outputs it to the optical fiber L0. The splitter unit 54 receives the wavelength channel output from the path selector unit 53a and transmits a predetermined wavelength channel to a receiver 14. The insertion unit 55 combines the wavelength channels transmitted from the transmitter 12 and transmits it to the path selector unit 53b.

For example, in the optical preamplifier unit 51, the power per channel (channel power), the total power on the receiving side, and spectrum monitoring value can be monitored as monitoring information. Also, in the optical post amplifier unit 52, the power per channel (channel power), total power, and spectrum monitoring value can be monitored as monitoring information. In the optical post amplifier unit 52, the total power on the transmitting side can be controlled as a variable parameter. In the path selector unit 53, the power per channel and total power can be monitored as monitoring information. In the path selector unit 53, the power per channel and signal band (bandwidth) can be controlled as variable parameters. In the transmitter 12, the power and center wavelength (center frequency) can be controlled as variable parameters. In the receiver 14, the quality factor (Q factor), optical signal to noise ratio (OSNR), spectrum monitoring value, and crosstalk (XT) monitoring value can be monitored as monitoring information. In the receiver 14, the state of polarization (SOP) monitoring value, the differential-group-delay (DGD) monitoring value, and wavelength dispersion monitoring value can be monitored as monitoring information. The Q factor may be acquired by converting a bit error ratio (BER).

Figure 5:
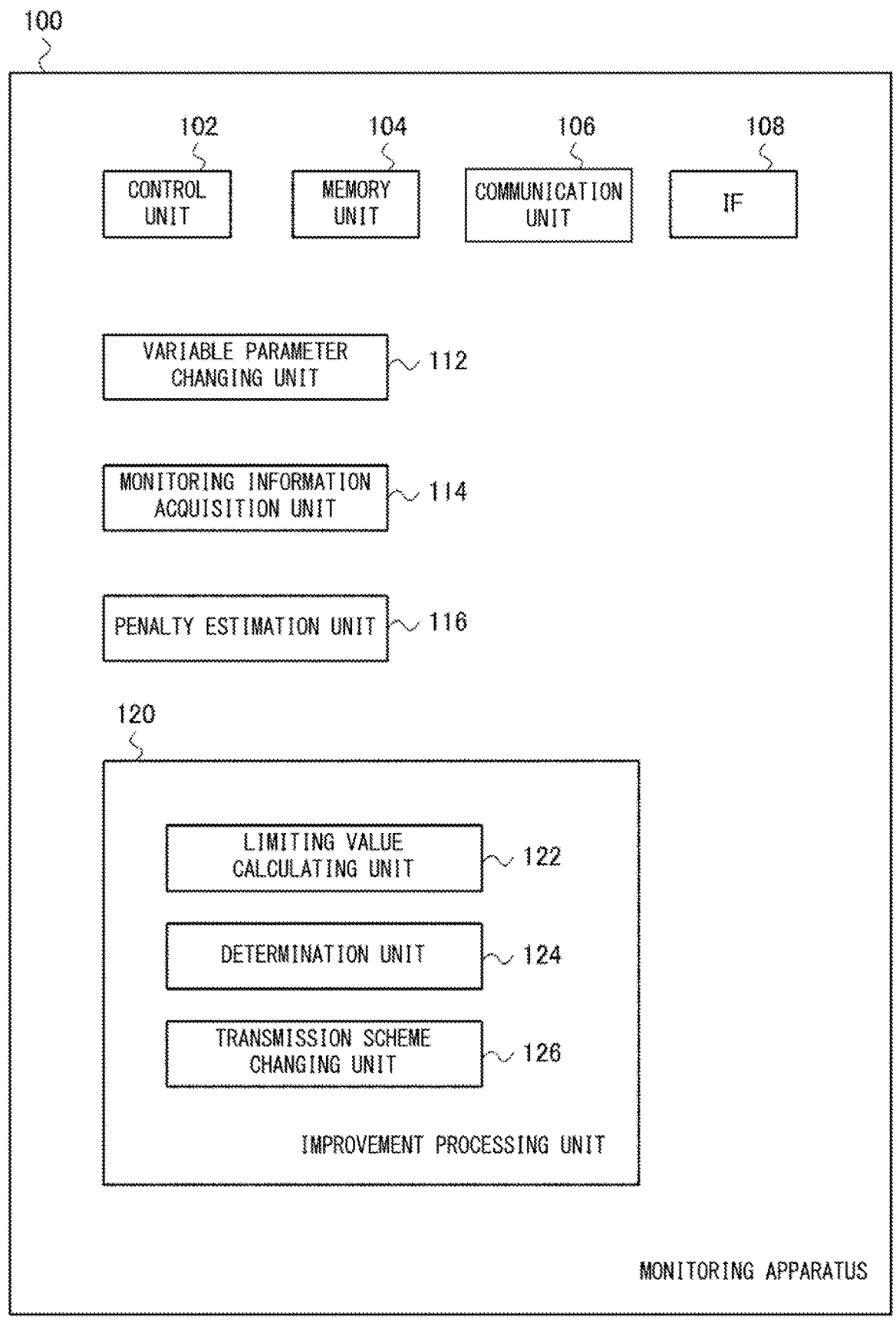
FIG. 5 is a diagram showing the configuration of the monitoring apparatus according to a first example embodiment.

FIG. 5 is a diagram showing the configuration of the monitoring apparatus 100 according to the first example embodiment. The monitoring apparatus 100 includes, as its main hardware components, a control unit 102, a memory unit 104, a communication unit 106, and an interface unit 108 (interface (IF)). The control unit 102, memory unit 104, communication unit 106, and interface unit 108 are interconnected via a data bus or the like.

The control unit 102 is a processor, such as a central processing unit (CPU). The control unit 102 functions as an arithmetic unit that performs control processing, arithmetic processing, and the like. The memory unit 104 is a memory (storage) device, such as a memory or hard disk, for example. The memory unit 104 is, for example, a read only memory (ROM) or random access memory (RAM). The memory unit 104 has a function of storing control programs, arithmetic programs, and the like to be executed by the control unit 102. The memory unit 104 has a function of temporarily storing processing data and the like. The memory unit 104 can include a database.

The communication unit 106 performs the processing needed to communicate with other apparatuses via a wired or wireless network or the like. The communication unit 106 can include communication ports, routers, firewalls, and the like. The interface unit 108 is, for example, a user interface (UI). The interface unit 108 includes an input device, such as a keyboard, touch panel, or mouse, and an output device, such as a display or speaker. The interface unit 108 receives operations of data input by a user (e.g., operator) and outputs information to the user.

The monitoring apparatus 100 includes, as its components, a variable parameter changing unit 112, a monitoring information acquisition unit 114, a penalty estimation unit 116, and an improvement processing unit 120. The improvement processing unit 120 includes a limiting value calculating unit 122, a determination unit 124, and a transmission scheme changing unit 126. The variable parameter changing unit 112 corresponds to the variable parameter changing unit 2 shown in FIG. 1. The variable parameter changing unit 112 functions as a variable parameter changing means. The monitoring information acquisition unit 114 corresponds to the monitoring information acquisition unit 4 shown in FIG. 1. The monitoring information acquisition unit 114 functions as a monitoring information acquisition means. The penalty estimation unit 116 corresponds to the estimation unit 6 shown in FIG. 1. The penalty estimation unit 116 functions as a penalty estimation means (estimation means).

The improvement processing unit 120 functions as an improvement processing means. The limiting value calculating unit 122 functions as a limiting value calculating means. The determination unit 124 functions as a determination means. The transmission scheme changing unit 126 functions as a transmission scheme changing means.

Note that each component can be implemented, for example, by executing a program under the control of the control unit 102. To be specific, each component can be implemented when the control unit 102 executes a program stored in the memory unit 104. Alternatively, each component can be implemented by recording a necessary program in any nonvolatile recording medium and installing it as necessary. Each component is not necessarily implemented using software executed by a program, and may be implemented by any combination of hardware, firmware, and software. Each component may be implemented using a user-programmable integrated circuit, such as a field-programmable gate array (FPGA) or a microcontroller, for example. In this case, this integrated circuit may be used to implement a program composed of the aforementioned components. Note that the specific functions of each component will be explained with reference to the flowchart below.

Figure 6:
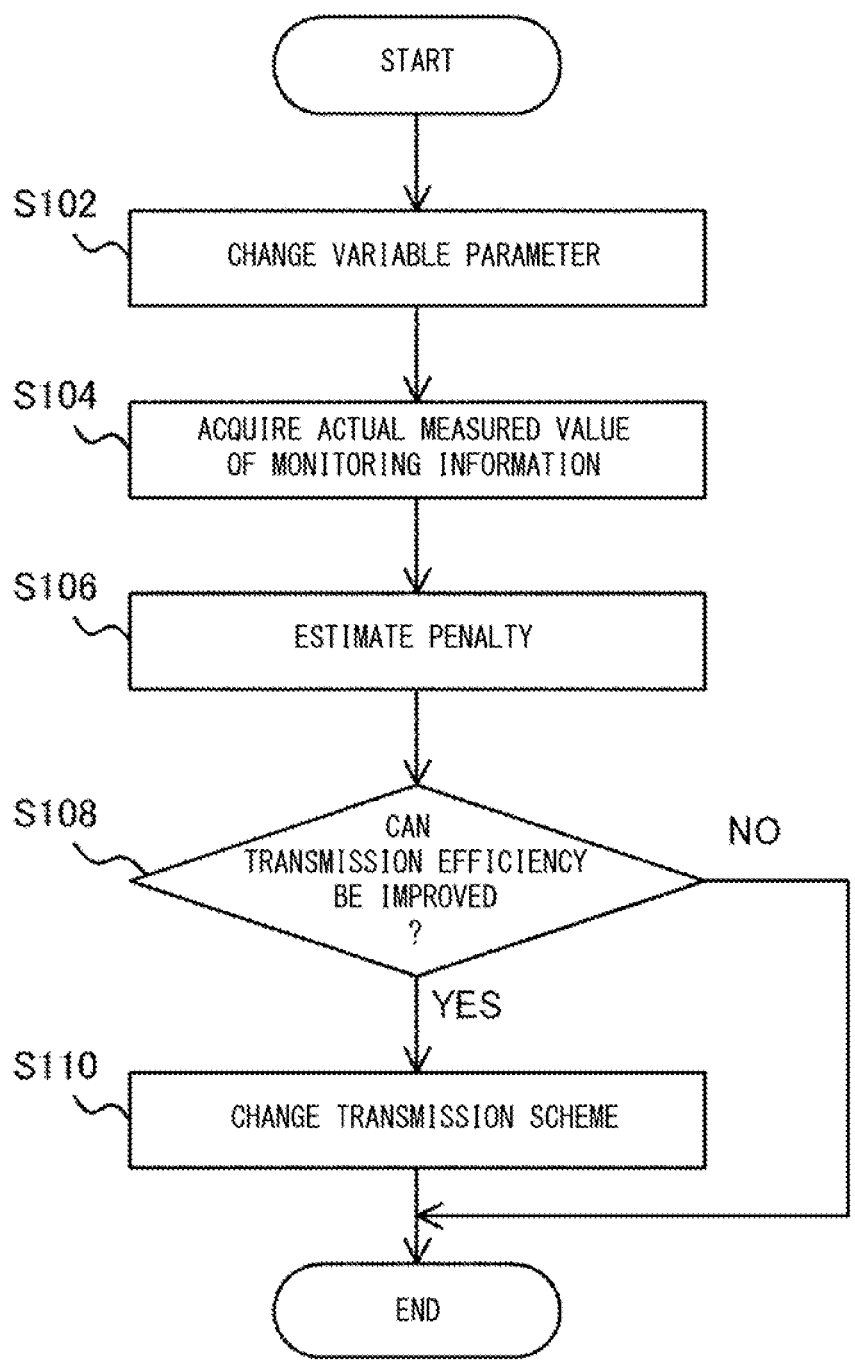
FIG. 6 is a flowchart showing the monitoring method executed in the monitoring apparatus according to a first example embodiment.

FIG. 6 is a flowchart showing the monitoring method executed in the monitoring apparatus 100 according to the first example embodiment. The variable parameter changing unit 112 changes the variable parameters in the same manner as S12 shown in FIG. 2 (Step S102). To be specific, the variable parameter changing unit 112 controls at least one of the network apparatuses constituting the optical communication network 11 shown in FIG. 3, thereby changing at least one of the aforementioned variable parameters. The variable parameter changing unit 112 can change the variable parameters step by step for each predetermined value. In other words, the variable parameter changing unit 112 can change the variable parameters at predetermined intervals (steps).

In the case where this method is applied when the optical communication network 11 is actually transmitting user data (main signals), the variable parameter changing unit 112 preferably changes the variable parameters within a range in which the optical signals can be transmitted. In other words, in the first example embodiment, the variable parameter changing unit 112 needs to change the variable parameters within a range in which communication errors do not occur. For example, the variable parameter changing unit 112, referring to a monitoring parameter indicating communication quality, such as Q factor or OSNR, which is acquired in the processing of S104 explained below, changes a variable parameter without causing this monitoring parameter to fall below a limiting value set not to cause communication errors.

The monitoring information acquisition unit 114 acquires the actual measured values of monitoring information as in S14 shown in FIG. 2 (Step S104). To be specific, the monitoring information acquisition unit 114 acquires the actual measured values of the aforementioned monitoring information by monitoring the monitoring information in at least one of the network apparatuses constituting the optical communication network 11 shown in FIG. 3. Note that the monitoring information acquisition unit 114 acquires at least the actual measured value of OSNR or Q factor as the monitoring information. In other words, the monitoring information acquisition unit 114 acquires at least the actual measured values of the first parameter (OSNR or Q factor) of the monitoring information indicating the communication quality for the optical signals transmitted from a network apparatus on a transmitting side to a network apparatus on a receiving side.

Here, the processing of S102 and S104 is repeated until acquiring the number of pieces of monitoring information needed to accurately estimate the penalty in the processing of S106 which will be explained below. In this way, multiple observation points can be acquired, whose elements are the values of the variable parameters and the actual measured values of the monitoring information at that time.

Similarly to S16 in FIG. 2, the penalty estimation unit 116 estimates at least one penalty for a receiving side (Step S106). To be specific, the penalty estimation unit 116 estimates the penalty, using the monitoring information acquired in the processing of S104. More specifically, the penalty estimation unit 116 estimates the penalty, using a look-up table (or conversion curve) that shows the correspondence relation between the values of monitoring information (monitoring values) and the penalties corresponding to the monitoring information. When a look-up table is used, interpolation processing, such as linear interpolation, can be performed as appropriate if the monitoring value is not in the look-up table. There are different look-up tables prepared for each modulation scheme. In other words, the penalty estimation unit 116 estimates the penalty using the lookup table for the current modulation scheme. The monitoring information and penalties are associated with each other by the lookup table. With such a lookup table, the penalty can be estimated efficiently. Note that a penalty is a value obtained by conversion into monitoring information indicating communication quality, such as OSNR, for example. In the following explanation, a penalty is supposed to be a value obtained by conversion into OSNR.

For example, the penalty estimation unit 116 may estimate the SOP variation penalty from a SOP monitoring value acquired in the processing of S104, using a look-up table for SOP monitoring. Note that a SOP variation penalty is a penalty that occurs with SOP variations. The penalty estimation unit 116 may also estimate the DGD penalty from the DGD monitoring value acquired in the processing of S104, using a look-up table. Note that a DGD penalty is a penalty that occurs with DGD. The penalty estimation unit 116 may also estimate the wavelength dispersion penalty from the wavelength dispersion monitoring values acquired in the processing of S104, using a look-up table. A wavelength dispersion penalty is a penalty that occurs with wavelength dispersion.

The penalty estimation unit 116 may also estimate the penalty, using multiple observation points whose elements are the values of the variable parameters and the actual measured values of monitoring information. In this case, for example, the variable parameter changing unit 112 may change the channel power or total power (hereinafter simply referred to as "power") as a variable parameter, in the processing of S102. In the processing of S104, the monitoring information acquisition unit 114 acquires a Q factor as monitoring information. The penalty estimation unit 116 acquires multiple observation points whose elements are the changed power and the Q factor related to the changed power. The penalty estimation unit 116 then estimates the nonlinear parameter (first physical factor), which is a physical factor of the optical fiber, from the multiple observation points. The penalty estimation unit 116 then estimates, from the nonlinear parameter estimated from the monitoring values, a nonlinear penalty (first penalty), using a look-up table related to the nonlinear parameter for the current modulation scheme. Here, a nonlinear parameter is a parameter that represents a nonlinear optical effect (nonlinear phenomenon) of an optical fiber. A nonlinear penalty is a penalty due to waveform degradation caused by a nonlinear optical effect in relation to a nonlinear parameter. In the lookup table for nonlinear penalties, nonlinear parameters obtained from monitoring information and nonlinear penalties are associated with each other. With this lookup table, the penalty can be estimated efficiently. A method of estimating nonlinear parameters and nonlinear penalties will be explained below with reference to FIGS. 7 and 8. The method of estimating nonlinear parameters and nonlinear penalties can be applied to other physical factors (first physical factors) and the related other penalties (first penalties).

The improvement processing unit 120 uses the estimated penalty to perform processing for improving the transmission efficiency (transmission capacity) of the optical communication network 11 (S108 and S110). The improvement processing unit 120 determines whether the transmission efficiency of the optical communication network 11 can be improved using the estimated penalty (Step S108). If it is determined that the transmission efficiency can be improved (YES in S108), the improvement processing unit 120 changes the transmission scheme of the optical communication network 11 to improve the transmission efficiency (Step S110).

To be specific, the improvement processing unit 120 uses the estimated penalty to calculate the OSNR limiting value needed at the network apparatus on the receiving side, assuming that the transmission scheme has been changed from the first transmission scheme to the second transmission scheme. Note that the second transmission scheme is a transmission scheme with a transmission efficiency improved from that of the first transmission scheme. The improvement processing unit 120 determines that the transmission scheme can be changed from the first transmission scheme to the second transmission scheme when the value obtained by subtracting the OSNR limiting value from the actual measured value of OSNR is greater than or equal to a predefined value. The details will be described below.

Here, the transmission scheme to be changed is, for example, the modulation scheme or error correction scheme. In changing the modulation scheme, increasing the modulation level increases the transmission capacity. In changing the error correction scheme, reducing the redundancy of FEC reduces the redundant bits during transmission and the bandwidth required for transmission, thereby increasing the transmission capacity of user data.

For example, suppose that the modulation scheme before improvement is a modulation scheme A (e.g., 100 Gbps). In this case, changing the modulation scheme to a modulation scheme B (e.g., 200 Gbps), which has a larger transmission capacity than the modulation scheme A, is expected to optimize the transmission efficiency of the entire network. In other words, the modulation scheme B has a transmission efficiency improved from that of the modulation scheme A. Here, generally, due to the influence of noise, a communication quality (e.g., OSNR) required for preventing a communication error may become higher by changing the modulation scheme from the modulation scheme A (first modulation scheme) to the modulation scheme B (second modulation scheme).

In contrast, this example embodiment allows for accurate penalty estimation and thus accurate estimation of a necessary communication quality, making it possible to properly determine whether the modulation scheme can be changed to the modulation scheme B which has a larger transmission capacity. Consequently, the transmission efficiency (transmission capacity) of the entire network can be efficiently optimized.

For example, suppose that the error correction scheme before improvement is an error correction scheme A (e.g., 25% redundancy). In this case, changing the error correction scheme to an error correction scheme B (e.g., 15% redundancy), which has a narrower transmission bandwidth and higher frequency utilization efficiency than the error correction scheme A, is expected to optimize the transmission efficiency of the entire network. In other words, the error correction scheme B has a transmission efficiency improved from that of the error correction scheme A. Changing the error correction scheme to the error correction scheme B increases the frequency utilization efficiency, resulting in a higher transmission capacity. In this case, changing the error correction scheme from the error correction scheme A (first error correction scheme) to the error correction scheme B (second error correction scheme) reduces the error correction capability, whereby a higher communication quality (e.g., OSNR) may be required to avoid communication errors. The communication quality required to avoid communication errors can be determined by the limiting value (FEC limit value) due to the error correction capability and the penalty. In contrast, this example embodiment allows for accurate penalty estimation and thus accurate estimation of a necessary communication quality, making it possible to properly determine whether the error correction scheme can be changed to the error correction scheme B which has a higher frequency utilization efficiency. Consequently, the transmission efficiency (transmission capacity) of the entire network can be efficiently optimized.

Figure 7:
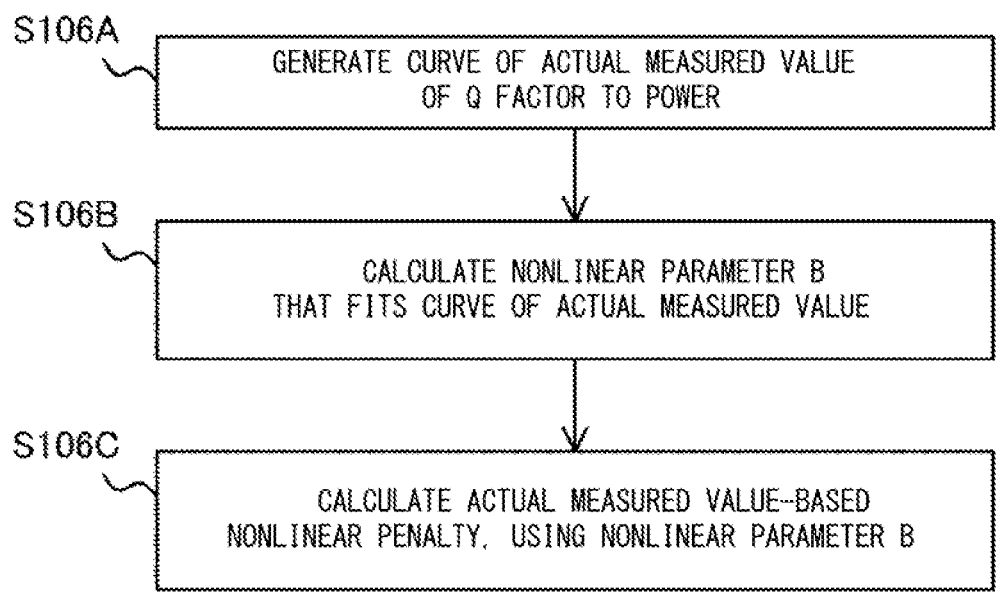
FIG. 7 is a flowchart showing a method of estimating a nonlinear penalty in the processing of S106.
Figure 8:
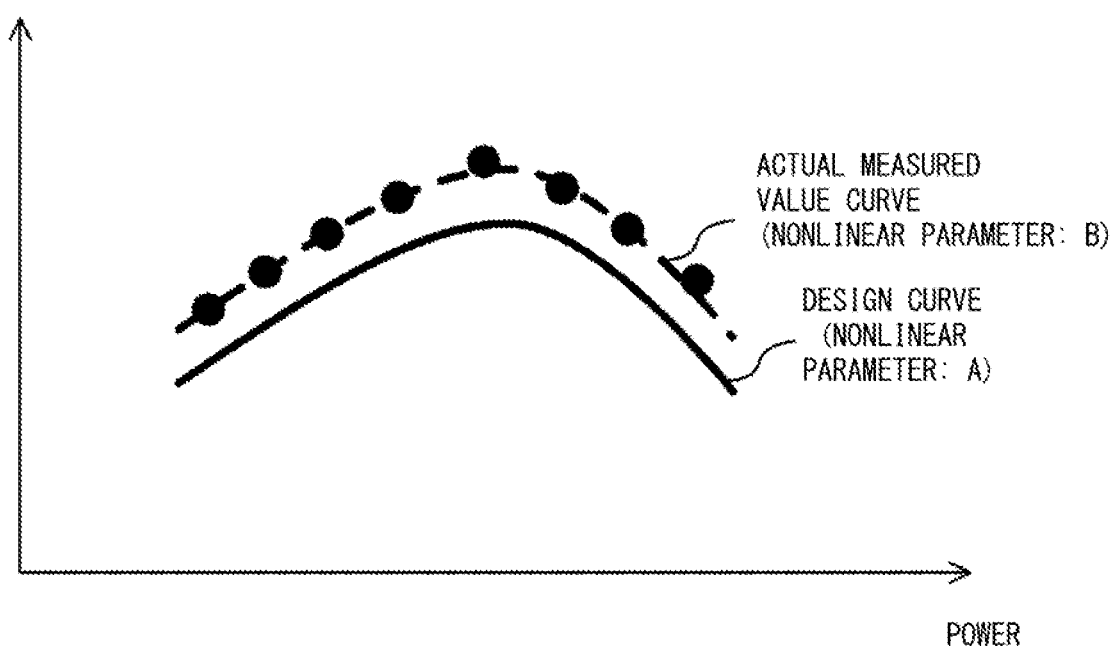
FIG. 8 is a diagram for explaining a nonlinear penalty estimation method.

FIG. 7 is a flowchart showing the nonlinear penalty estimation method in the processing of S106. FIG. 8 is a diagram for explaining the nonlinear penalty estimation method. FIG. 8 is a graph showing a curve that shows the relationship between the power and Q factor. In the graph of FIG. 8, the horizontal axis represents the power and the vertical axis represents the Q factor. The solid line shows the curve of the Q factor to the power (design curve) for the modulation scheme A in the design stage. The dashed line is the curve of the actual measured value of the Q factor to the power, generated from the actual measured values of the power and Q factor for the modulation scheme A. The design curve is generated using the function F with power as the argument and Q factor as the return value. Suppose that "A" is pre-set as a nonlinear parameter in this function F in the design stage.

The penalty estimation unit 116 generates the curve of the actual measured value of the Q factor to the power (Step S106A). To be specific, the penalty estimation unit 116 plots multiple observation points (indicated by the black dots in FIG. 8) whose elements are power and a Q factor related to the power, thereby generating the curve of the actual measured value shown in FIG. 8.

The penalty estimation unit 116 calculates a nonlinear parameter that fits the curve of the actual measured value (Step S106B). To be specific, the penalty estimation unit 116 changes the nonlinear parameter from the preset "A" in the function F that was used for generating the design curve. The penalty estimation unit 116 then adjusts the nonlinear parameters so that the curve indicated by the function F fits the curve of the actual measured value. Subsequently, the penalty estimation unit 116 calculates the nonlinear parameter observed when the curve indicated by the function F best fits the curve of the actual measured value. The nonlinear parameter at this time is "B".

The penalty estimation unit 116 calculates the actual measured value-based nonlinear penalty using a nonlinear parameter B (Step S106C). To be specific, the penalty estimation unit 116 calculates, referring to the lookup table for the current modulation scheme (modulation scheme A) related to the nonlinear parameter, the value of the nonlinear penalty corresponding to the nonlinear parameter "B". Note that this nonlinear penalty corresponds to the penalty shown in (B) of FIG. 10, which will be described below.

Figure 9:
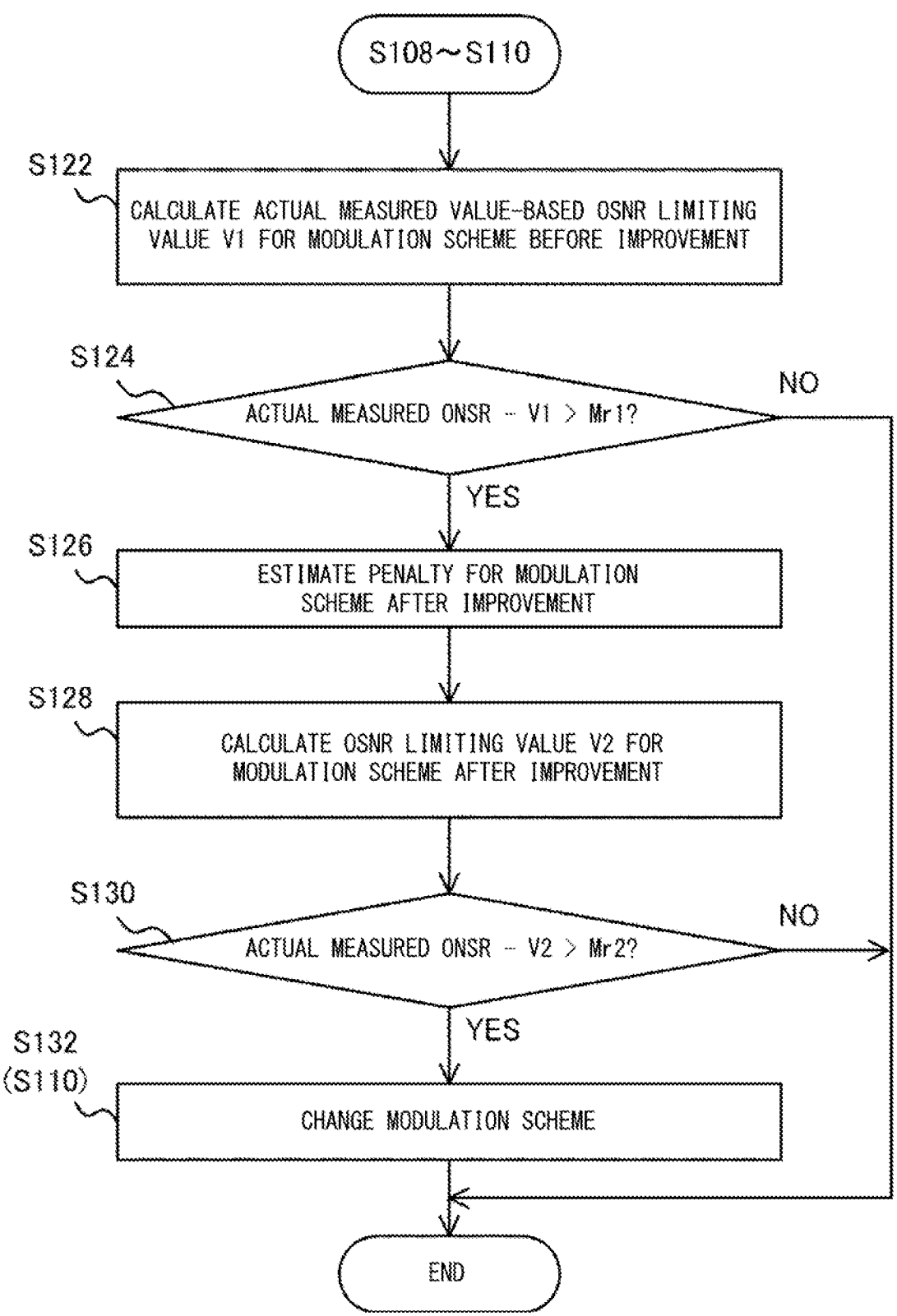
FIG. 9 is a flowchart showing the details of the processing by which an improvement processing unit according to a first example embodiment determines whether or not to change the modulation scheme.
Figure 10:
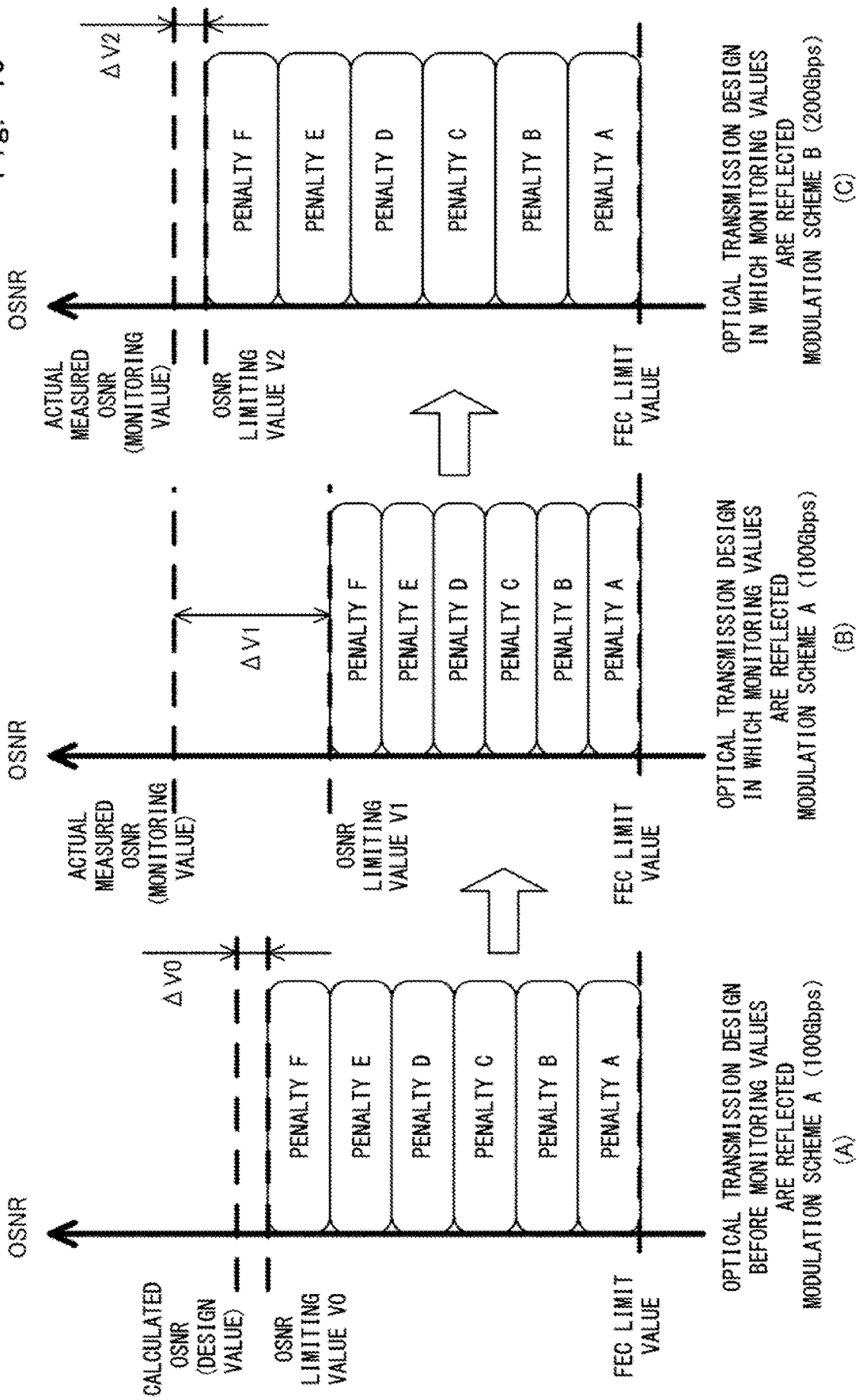
FIG. 10 is a diagram for explaining processing for determining whether or not to change the modulation scheme.

FIG. 9 is a flowchart showing the details of the processing by which the improvement processing unit 120 according to the first example embodiment determines whether or not to change the modulation scheme. FIG. 10 is a diagram for explaining the processing for determining whether or not to change the modulation scheme. FIG. 9 shows the details of the processing of S108 to S110 shown in FIG. 6. FIG. 10 shows the case where the scheme can be changed from the modulation scheme A to the modulation scheme B.

The limiting value calculating unit 122 calculates the actual measured value-based OSNR limiting value V1 for the modulation scheme before improvement (Step S122). To be specific, the limiting value calculating unit 122 calculates the OSNR limiting value V1 from the FEC limit value and the accumulation (sum) of multiple penalties estimated in the processing of S106. Note that the FEC limit value is obtained by conversion into OSNR. The OSNR limiting value (required OSNR) is the limiting value of OSNR required for avoiding communication errors at the network apparatus on the receiving side. If the actual measured OSNR on the receiving side for a signal transmitted from the transmitting side falls below the OSNR limiting value, a communication error occurs and the optical signal cannot be transmitted properly. The limiting value calculating unit 122 adds multiple penalties to the FEC limit value to calculate the OSNR limiting value V1.

The determination unit 124 determines whether ΔV1 which is a value obtained by subtracting the OSNR limiting value V1 from the actual measured ONSR that was acquired as monitoring information exceeds Mr1 which is a predetermined value (margin) (Step S124). Note that Mr1 can be preset assuming a high possibility that transmission can be made even if the modulation scheme is changed. If ΔV1 which is a value obtained by subtracting the OSNR limiting value V1 from the actual measured ONSR is less than or equal to Mr1 (NO in S124), the improvement processing unit 120 determines not to change the modulation scheme. Accordingly, the processing ends.

In contrast, if ΔV1 which is a value obtained by subtracting the OSNR limiting value V1 from the actual measured ONSR exceeds Mr1 (YES in S124), the improvement processing unit 120 determines whether the modulation scheme can be changed (S126 to S130). The limiting value calculating unit 122 estimates the penalty for the modulation scheme after improvement (Step S126). Therefore, the limiting value calculating unit 122 also functions as an estimation means used to estimate penalties. The processing of S126 may be performed in the penalty estimation unit 116.

To be specific, like in the processing of S106, the limiting value calculating unit 122 estimates the penalty, using the monitoring information that was acquired in the processing of S104. In this case, in the processing of S126, the limiting value calculating unit 122 estimates (calculates) the penalty related to the monitoring information that was acquired in the processing of S104, using a lookup table (or conversion curve) for the modulation scheme after improvement. The limiting value calculating unit 122 estimates the nonlinear penalty from the nonlinear parameter that was calculated in the processing of S106B, using a look-up table related to the nonlinear parameter for the modulation scheme after improvement. In this case, as shown in (C) of FIG. 10, with the modulation scheme after improvement, penalties can be larger than with the modulation scheme before improvement because the modulation scheme after improvement is more susceptible to noise.

The limiting value calculating unit 122 calculates the OSNR limiting value V2 for the modulation scheme after improvement (Step S128). To be specific, the limiting value calculating unit 122 calculates the OSNR limiting value V2 from the FEC limit value and the accumulation (sum) of multiple penalties that were estimated in the processing of S126. More specifically, like in the processing of S122, the limiting value calculating unit 122 calculates the OSNR limit value V2 by adding the multiple penalties that were estimated in the processing of S126 to the FEC limit value. In other words, the limiting value calculating unit 122 calculates the OSNR limiting value necessary at the network apparatus on the receiving side, by estimating the penalties assuming that the modulation scheme has been changed from the modulation scheme A to the modulation scheme B.

The determination unit 124 determines whether ΔV2 which is a value obtained by subtracting the OSNR limiting value V2 from the actual measured ONSR that was acquired as monitoring information exceeds Mr2 which is a predetermined value (margin) (Step S130). Note that Mr2 is a predetermined value higher than or equal to 0. It is possible that Mr2<Mr1.

If ΔV2 which is a value obtained by subtracting the OSNR limiting value V1 from the actual measured ONSR is less than or equal to Mr2 (NO in S130), the improvement processing unit 120 determines not to change the modulation scheme because of the risk that changing the modulation scheme causes a communication error. Accordingly, the processing ends. In contrast, if ΔV2 exceeds Mr2 (YES in S130), the improvement processing unit 120 determines to change the modulation scheme because of the extremely low risk that changing the modulation scheme causes a communication error. In other words, the improvement processing unit 120 determines that the modulation scheme can be changed from the modulation scheme A to the modulation scheme B if the value obtained by subtracting the OSNR limiting value from the OSNR actual measured value is equal to or more than a predetermined value. The transmission scheme changing unit 126 changes the modulation scheme from the modulation scheme A to the modulation scheme B (Step S132). To be specific, the transmission scheme changing unit 126 controls the transmitter 12 and receiver 14 to change the modulation scheme.

In FIG. 10, in the design stage where the monitoring information has not yet to be acquired, the optical transmission design uses, as shown in (A), the calculated OSNR, penalties (penalties A to F), and the design value of the OSNR limiting value V0. The calculated OSNR can be calculated based on the state of the transmission path from the network apparatus on the transmitting side to the network apparatus on the receiving side (e.g., amplifier NF (noise figure) and the number of amplifiers, and the like). The penalties A to F are, for example, the nonlinear penalty, SOP variation penalty, the DGD penalty, and wavelength dispersion penalty. In the design stage, the penalties A to F can be calculated from the design values of the corresponding monitoring values, using a look-up table for the modulation scheme (modulation scheme A) to be employed in the design stage. In the design stage, the nonlinear penalty can be calculated from the design values of the nonlinear parameters, using a look-up table for the modulation scheme (modulation scheme A) to be employed. The FEC limit value is preset according to the FEC scheme (error correction scheme) to be employed in the design stage.

As shown in (A) of FIG. 10, in the design stage, the OSNR limiting value V0 is obtained by adding the design values of the penalties A to F to the FEC limit value. Further, in the design stage, the transmission scheme and the like is determined so that ΔV0, which is a value obtained by subtracting the OSNR limiting value V0 from the calculated OSNR, is greater than or equal to 0 (or a predetermined margin of 0 or greater). In the design stage, the optical transmission design is performed so that the calculated OSNR is made small and the penalties are made large, taking into account the worst communication conditions, in order to prevent communication errors. In the example shown in (A), ΔV0, which is a value obtained by subtracting the OSNR limiting value V0 from the calculated OSNR, is greater than or equal to 0, and the modulation scheme A can therefore be adopted.

Further, through the processing of S106, the penalties A to F are estimated from the monitoring values (actual measured values). As shown in (B) of FIG. 10, the estimated penalties A to F can be smaller than the penalties A to F assumed in the design stage. In other words, although the worst communication conditions are taken into consideration in the design stage, the actual communication conditions can be better than those assumed in the design stage. The penalties A to F are calculated from the actual measured values of the corresponding monitoring values, using a look-up table for the adopted modulation scheme (modulation scheme A). The nonlinear penalties are calculated from the estimated values of the nonlinear parameters, using the look-up table for the adopted modulation scheme (modulation scheme A).

In this case, the limiting value calculating unit 122 calculates the OSNR limiting value V1 by adding the estimated values of the penalties A to F to the FEC limit value (S122). Since the actual communication state can be better than that assumed in the design stage, as shown in (B) of FIG. 10, the actual measured OSNR can be higher than the calculated OSNR assumed in the design stage. For this reason, ΔV1, which is a value obtained by subtracting the OSNR limiting value V1 from the actual measured ONSR, can be larger than ΔV0 and can exceed Mr1.

In this case, as shown in (C) of FIG. 10, the processing of S126 allows for estimation of the penalty for the modulation scheme after improvement. To be specific, the penalties A to F are calculated from the actual measured values of the corresponding monitoring values, using a look-up table for the modulation scheme B after improvement. The nonlinear penalties are calculated from the estimated values of the nonlinear parameters, using the look-up table for the modulation scheme B after improvement. If ΔV2, which is a value obtained by subtracting the OSNR limiting value V2 from the actual measured ONSR, exceeds Mr2, the modulation scheme is changed to the modulation scheme B. In this way, the monitoring apparatus 100 according to the first example embodiment can efficiently determine whether the modulation scheme can be changed.

Figure 11:
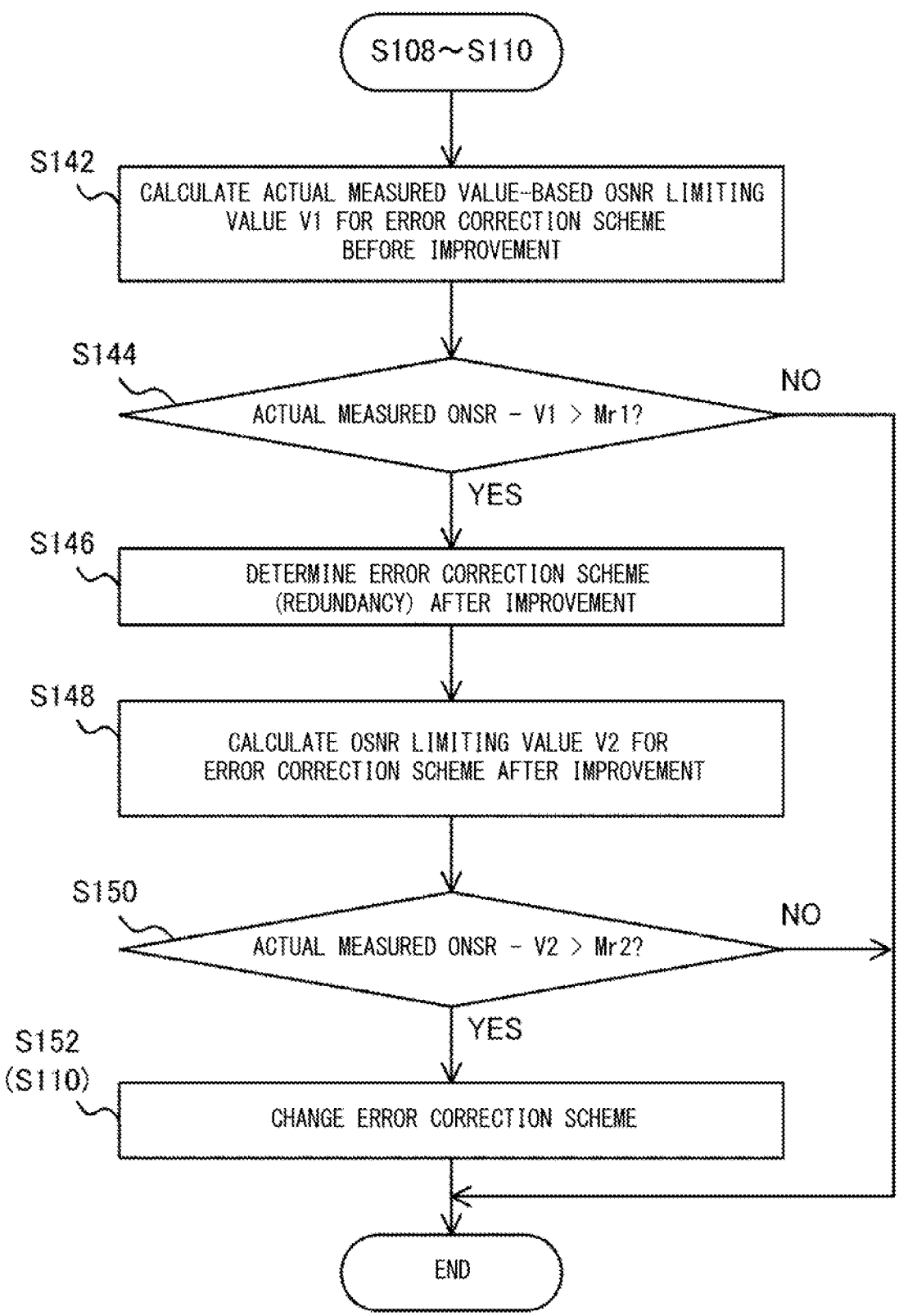
FIG. 11 is a flowchart showing the details of the processing by which the improvement processing unit according to a first example embodiment determines whether or not to change the error correction scheme.
Figure 12:
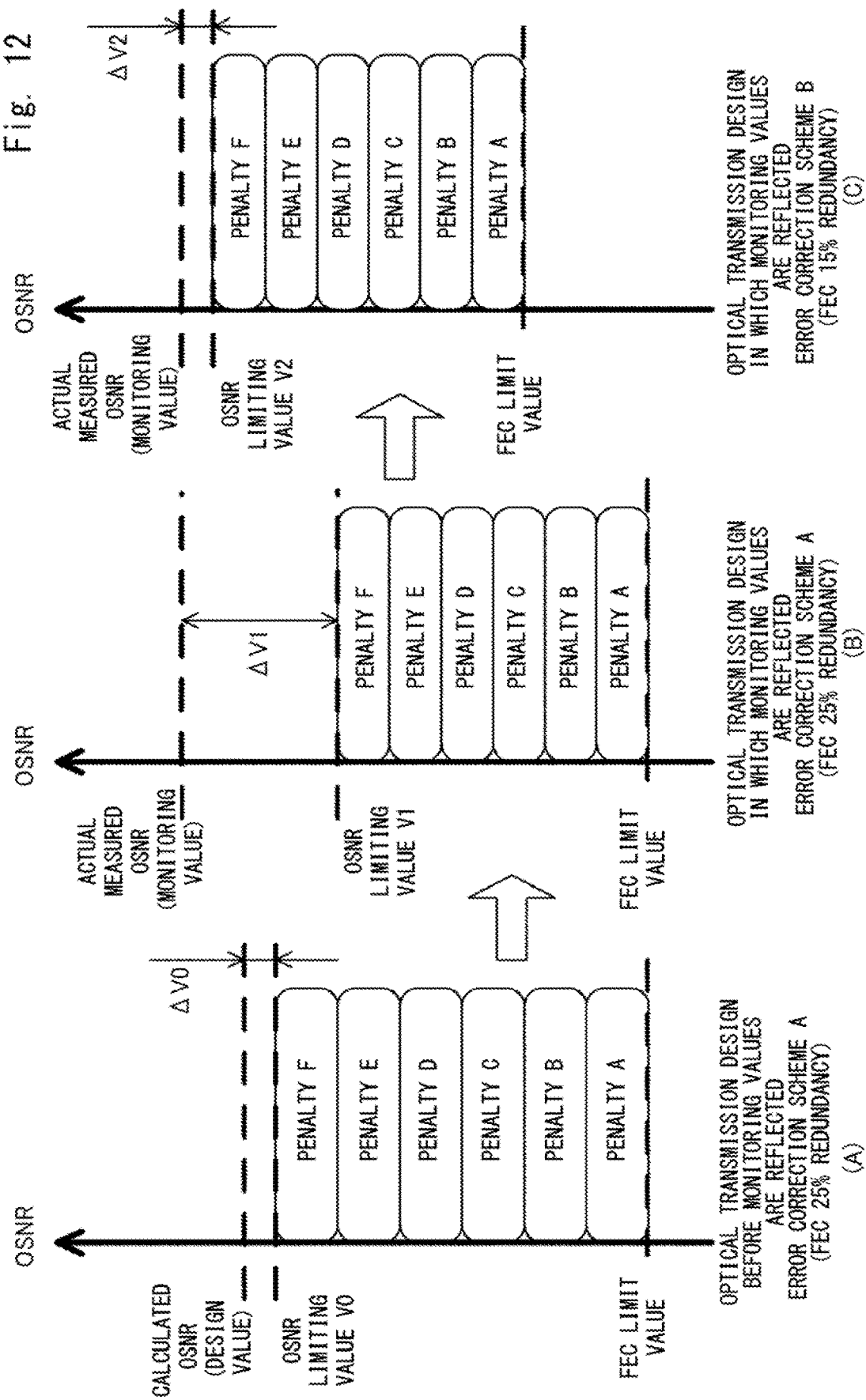
FIG. 12 is a diagram for explaining the processing for determining whether or not to change the error correction scheme.

FIG. 11 is a flowchart showing the details of the processing by which the improvement processing unit 120 according to the first example embodiment determines whether or not to change the error correction scheme. FIG. 12 is a diagram for explaining the processing for determining whether or not to change the error correction scheme. FIG. 11 shows the details of the processing of S108 to S110 shown in FIG. 6. FIG. 12 shows the case where the error correction scheme can be changed from the error correction scheme A to the error correction scheme B.

The limiting value calculating unit 122 calculates the measured value-based OSNR limiting value V1 for the error correction scheme before improvement (Step S142). To be specific, like in the processing of S122, the limiting value calculating unit 122 calculates the OSNR limiting value V1 from the FEC limit value and the accumulation (sum) of multiple penalties that were estimated in the processing of S106.

The determination unit 124 determines whether ΔV1 which is a value obtained by subtracting the OSNR limiting value V1 from the actual measured ONSR that was acquired as monitoring information exceeds Mr1 which is a predetermined value (margin) (Step S144). If ΔV1 which is a value obtained by subtracting the OSNR limiting value V1 from the actual measured ONSR is less than or equal to Mr1 (NO in S144), the improvement processing unit 120 determines not to change the error correction scheme. Accordingly, the processing ends.

In contrast, if ΔV1 which is a value obtained by subtracting the OSNR limiting value V1 from the actual measured ONSR exceeds Mr1 (YES in S144), the improvement processing unit 120 determines whether the error correction scheme can be changed (S146 to S150). The limiting value calculating unit 122 determines the error correction scheme after improvement (Step S146). In this way, the redundancy of the error correction scheme after improvement is determined. The redundancy of the error correction scheme after improvement of transmission efficiency is smaller than that of the error correction scheme before the improvement. Further, the FEC limit value for the error correction scheme after improvement is determined. Suppose that the FEC limit value is predetermined for each corresponding error correction scheme. The smaller the FEC redundancy, the greater the FEC limit value.

The limiting value calculating unit 122 calculates the OSNR limiting value V2 for the error correction scheme after improvement (Step S148). To be specific, the limiting value calculating unit 122 calculates the OSNR limiting value V2 from the FEC limit value that was determined in the processing of S146 and the accumulation (sum) of multiple penalties that were estimated in the processing of S106. More specifically, like in the processing of S142, the limiting value calculating unit 122 calculates the OSNR limiting value V2 by adding the multiple penalties that were estimated in the processing of S106 to the FEC limit value that was determined in the processing of S146. In other words, the limiting value calculating unit 122 calculates the OSNR limiting value necessary at the network apparatus on the receiving side, by estimating the penalties assuming that the error correction scheme has been changed from the error correction scheme A to the error correction scheme B.

The determination unit 124 determines whether ΔV2 which is a value obtained by subtracting the OSNR limiting value V2 from the actual measured ONSR that was acquired as monitoring information exceeds Mr2 which is a predetermined value (margin) (Step S150). Note that Mr2 is a predetermined value higher than or equal to 0. It is possible that Mr2<Mr1.

If ΔV2 which is a value obtained by subtracting the OSNR limiting value V1 from the actual measured ONSR is less than or equal to Mr2 (NO in S150), the improvement processing unit 120 determines not to change the error correction scheme because of the risk that changing the error correction scheme causes a communication error. Accordingly, the processing ends. In contrast, if ΔV2 exceeds Mr2 (YES in S150), the improvement processing unit 120 determines to change the error correction scheme because of the extremely low risk that changing the error correction scheme causes a communication error. In other words, the improvement processing unit 120 determines that the error correction scheme can be changed from the error correction scheme A to the error correction scheme B if the value obtained by subtracting the OSNR limiting value from the OSNR actual measured value is equal to or more than a predetermined value. Subsequently, the transmission scheme changing unit 126 changes the error correction scheme from the error correction scheme A to the error correction scheme B (Step S152). To be specific, the transmission scheme changing unit 126 controls the transmitter 12 and receiver 14 to change the error correction scheme.

As explained with reference to FIG. 10, referring to FIG. 12, in the design stage where the monitoring information has not yet to be acquired, the optical transmission design uses, as shown in (A), the calculated OSNR, penalties (penalties A to F), and the design value of the OSNR limiting value V0. As mentioned above, the penalties A-F are predetermined in the design stage. In addition, as described above, the FEC limit value is preset according to the FEC scheme (error correction scheme) to be employed in the design stage.

As shown in (A) of FIG. 12, in the design stage, the OSNR limiting value V0 is obtained by adding the design values of the penalties A to F to the FEC limit value. Further, in the design stage, the transmission scheme and the like is determined so that ΔV0, which is a value obtained by subtracting the OSNR limiting value V0 from the calculated OSNR, is greater than or equal to 0 (or a predetermined margin of 0 or greater). In the design stage, the optical transmission design is performed so that the calculated OSNR is made small and the penalties are made large, taking into account the worst communication conditions, in order to prevent communication errors. In the example shown in (A), ΔV0, which is a value obtained by subtracting the OSNR limiting value V0 from the calculated OSNR, is greater than or equal to 0, and the error correction scheme A can therefore be adopted.

Further, as explained with reference to FIG. 10, through the processing of S106, the penalties A to F are estimated from the monitoring values (actual measured values). As shown in (B) of FIG. 12, the estimated penalties A to F can be smaller than the penalties A to F assumed in the design stage.

In this case, the limiting value calculating unit 122 calculates the OSNR limiting value V1 by adding the estimated values of the penalties A to F to the FEC limit value (S142). Since the actual communication state can be better than that assumed in the design stage, as shown in (B) of FIG. 12, the actual measured OSNR can be higher than the calculated OSNR assumed in the design stage. For this reason, ΔV1, which is a value obtained by subtracting the OSNR limiting value V1 from the actual measured ONSR, can be larger than ΔV0 and can exceed Mr1.

In this case, as shown in (C) of FIG. 12, the processing of S146 allows the OSNR limiting value V2 to be calculated using the FEC limit value for the error correction scheme after improvement. If ΔV2, which is a value obtained by subtracting the OSNR limiting value V2 from the actual measured ONSR, exceeds Mr2, the error correction scheme is changed to the modulation scheme B. In this way, the monitoring apparatus 100 according to the first example embodiment can efficiently determine whether the error correction scheme can be changed.

When the redundancy of the FEC can be reduced, the bandwidth required for optical transmission can be reduced and the spacing between signal wavelengths can be narrowed. Thus, frequency utilization efficiency can be increased. Furthermore, reducing the redundancy of the FEC can also reduce power consumption. Thus, reducing the redundancy of the FEC can optimize transmission efficiency.

As described above, the monitoring apparatus 100 according to the first example embodiment is configured to estimate penalties, using monitoring information obtained by changing the variable parameters. This allows the penalties to be estimated using many types of monitoring information obtained under various conditions. Thus, the penalties can be estimated accurately. Hence, the transmission efficiency of the entire network can be efficiently optimized.

Since, in the first example embodiment, it is possible to acquire many types of monitoring information obtained under various conditions, the monitoring information can be used in a machine learning algorithm. In other words, a machine learning algorithm, that can estimate penalties using many types of monitoring information, can be generated. For example, the look-up tables for estimating the penalties may be updated using the many types of monitoring information and the machine learning algorithm. Alternatively, the machine learning algorithm may be generated using the many types of monitoring information instead of the look-up tables. In this case, the penalty estimation unit 116 may estimate the penalties using the machine learning algorithm. Alternatively, using many types of monitoring information, a machine learning algorithm that can select the optimal transmission scheme from the monitoring information may be generated. In this case, use of the learned machine learning algorithm allows the optimal transmission scheme to be selected using a little monitoring information.

Second Example Embodiment

Next, a second example embodiment will be described. For the sake of clarity of explanation, the following descriptions and drawings are abbreviated or simplified as appropriate. In each drawing, identical elements are denoted by the same reference numeral, and duplicate explanations are omitted as needed. The system configuration according to the second example embodiment is substantially the same as that shown in FIG. 3, so its explanation will be omitted. The configuration of the monitoring apparatus 100 according to the second example embodiment is substantially the same as that shown in FIG. 5, so its explanation will be omitted. The second example embodiment differs from the first example embodiment in that it sets a monitoring channel.

Figure 13:
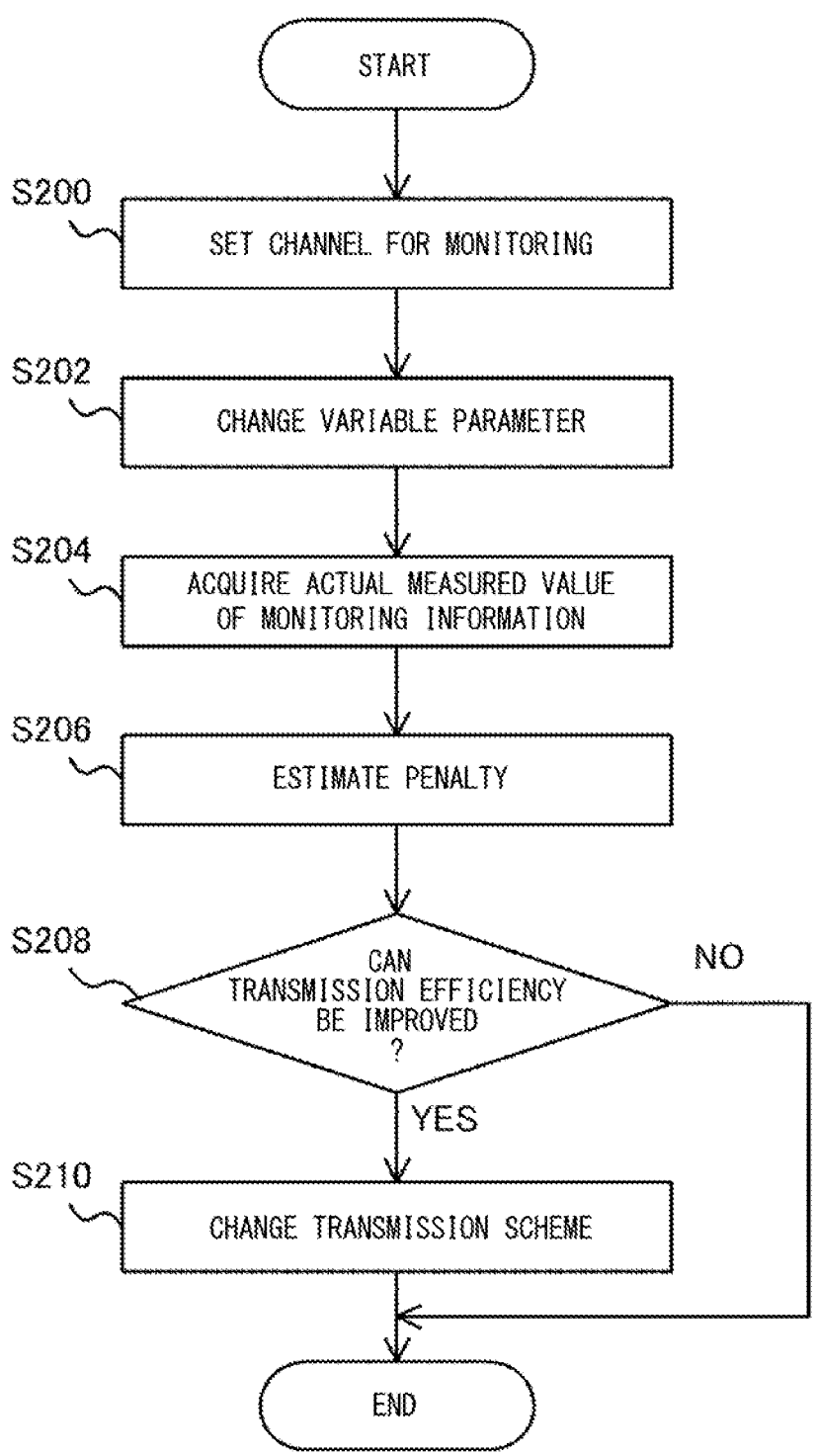
FIG. 13 is a flowchart showing a monitoring method executed in a monitoring apparatus according to a second example embodiment.

FIG. 13 is a flowchart showing a monitoring method executed in the monitoring apparatus 100 according to the second example embodiment. The monitoring apparatus 100 sets a channel for monitoring (Step S200). To be specific, the monitoring apparatus 100 (e.g., the variable parameter changing unit 112) sets a channel (wavelength) that does not carry user data (main signals). The monitoring apparatus 100 sets this channel that does not carry main signals to the channel for monitoring.

Like in S102 shown in FIG. 6, the variable parameter changing unit 112 changes the variable parameters (Step S202). In the second example embodiment, the variable parameter changing unit 112 changes the variable parameters for the optical signals for transmitting the monitoring channel set in the processing of S200. Here, since main signals are not transmitted to the channel for monitoring, the variable parameter changing unit 112 can also change the variable parameters, beyond the range where communication errors do not occur. Thus, compared to the case of the first example embodiment, the variable parameter changing unit 112 can change the variable parameters within a wide range of changes. For example, the variable parameter changing unit 112 may change the variable parameters until the actual measured OSNR falls below the FEC limit value. Thus, in the second example embodiment, the variable parameters can be changed until a communication error occurs.

Like in S104 shown in FIG. 6, the monitoring information acquisition unit 114 acquires the actual measured value of the monitoring information (Step S204). In this case, in the second example embodiment, the variable parameters can be changed until a communication error occurs, so the monitoring information acquisition unit 114 can acquire the monitoring information in a state where a communication error is occurring. Thus, the monitoring information acquisition unit 114 according to the second example embodiment is capable of acquiring more monitoring information compared to the case in the first example embodiment.

Like in S106 shown in FIG. 6, the penalty estimation unit 116 estimates at least one penalty for a receiving side (Step S206). In this case, as mentioned above, more monitoring information can be acquired in the second example embodiment than in the case of the first example embodiment. Therefore, the penalty estimation unit 116 according to the second example embodiment can estimate the penalty more accurately compared to the case in the first example embodiment. For example, in the aforementioned nonlinear penalty estimation method, observation points whose elements are power and Q factor can be acquired over a wider range. Therefore, the observation points can be plotted over a wider range than the range plotted in the case of the first example embodiment. Therefore, nonlinear parameters that fit the actual measured values can be calculated more accurately; thus, the nonlinear penalties can be estimated more accurately.

Like in S108 and S110 shown in FIG. 6, the improvement processing unit 120 performs processing for improving the transmission efficiency (transmission capacity) of the optical communication network 11, using the estimated penalties (S208 and S210). In this case, as mentioned above, in the second example embodiment, penalties can be estimated more accurately compared to the case in the first example embodiment. Therefore, in the second example embodiment, it can be more accurately determined whether or not to improve the transmission efficiency compared to the case in the first example embodiment.

Modification

Note that the present invention is not limited to the aforementioned example embodiments, and can be modified as appropriate without departing from its scope. For example, the orders of processing (steps) in the aforementioned flowcharts can be changed as appropriate. One or more of the multiple types of processing (steps) may be omitted. For example, the processing of S122 to S124 shown in FIG. 9 may be omitted. In other words, when a penalty is estimated by the processing of S106, it may be always determined whether or not the modulation scheme can be changed by the processing of S126 to S130.

While the monitoring information (first parameter) indicating a communication quality is an OSNR or Q factor in the aforementioned example embodiments, this configuration is merely one example. The monitoring information (first parameter) indicating a communication quality may be a parameter other than an OSNR or Q factor (e.g., BER).

In the aforementioned examples, a program can be stored in any of various types of non-transitory computer-readable media and supplied to a computer. Non-transitory computer-readable media include various types of tangible storage media. Examples of non-transitory computer-readable media include magnetic storage media (e.g., flexible disks, magnetic tapes, and hard disk drives), magneto-optical storage media (e.g., magneto-optical disks), CD-ROM (read only memories), CD-R, CD-R/W, and semiconductor memories (e.g., mask ROMs, programmable ROMs (PROMs), erasable PROMs (EPROMs), flash ROMs, and random access memories (RAMs)). Alternatively, the program may be provided to the computer through any of various types of transitory computer readable media. Examples of transitory computer readable media include electrical signals, optical signals, and electromagnetic waves. A transitory computer readable medium can provide a program to a computer via wired communication paths, such as wires and optical fibers, or wireless communication paths.

The present invention has been described above with reference to the example embodiments, but the present invention is not limited by the above description. Various modifications clear to those skilled in the art can be made to the configuration and details of the present invention without departing from the scope of the invention.

This application is based upon and claims the benefit of priority from Japanese Patent Application No. 2020-059470, filed on Mar. 30, 2020; the entire contents of which are incorporated herein by reference.

REFERENCE SIGNS LIST

1 MONITORING APPARATUS
2 VARIABLE PARAMETER CHANGING UNIT
4 MONITORING INFORMATION ACQUISITION UNIT
6 ESTIMATION UNIT
10 MONITORING SYSTEM
11 OPTICAL COMMUNICATION NETWORK
12 TRANSMITTER
14 RECEIVER
20 MULTIPLEXER APPARATUS
30 RELAY APPARATUS
40 SEPARATOR APPARATUS
100 MONITORING APPARATUS
112 VARIABLE PARAMETER CHANGING UNIT
114 MONITORING INFORMATION ACQUISITION UNIT
116 PENALTY ESTIMATION UNIT
120 IMPROVEMENT PROCESSING UNIT
122 LIMITING VALUE CALCULATING UNIT
124 DETERMINATION UNIT
126 TRANSMISSION SCHEME CHANGING UNIT

What is claimed is:
1. A monitoring apparatus comprising:
hardware, including a processor and memory;
variable parameter changing unit implemented at least by the hardware and configured to change a variable parameter that is related to a characteristic of optical communication and is changeable for at least one of multiple network apparatuses that constitute an optical communication network transmitting optical signals by wavelength division multiplexing;

monitoring information acquisition unit implemented at least by the hardware and configured to acquire at least one piece of monitoring information related to a state of the optical communication from the at least one of the multiple network apparatuses;

estimation unit implemented at least by the hardware and configured to estimate at least one penalty for a network apparatus on a receiving side, which receives optical signals in the optical communication, among the multiple network apparatuses, using the monitoring information; and improvement processing unit implemented at least by the hardware and configured to determine whether a transmission efficiency of the optical communication network can be improved, using the estimated penalty, and, if it is determined that the transmission efficiency can be improved, performs processing for changing a transmission scheme so that the transmission efficiency can be improved, by changing the transmission scheme from a first transmission scheme to a second transmission scheme whose transmission efficiency is improved from that of the first transmission scheme, wherein:

the monitoring information acquisition unit acquires at least an actual measured value of a first parameter of the monitoring information indicating a communication quality of an optical signal transmitted from a network apparatus on a transmitting side, which transmits the optical signals in the optical communication, among the multiple network apparatuses, to the network apparatus on the receiving side, and the improvement processing unit:
in order to determine whether the transmission efficiency can be improved, calculates, using the estimated penalty, a limiting value of the first parameter needed in the network apparatus on the receiving side, in a case where the transmission scheme would be changed from the first transmission scheme to the second transmission scheme, and when a value obtained by subtracting the limiting value of the first parameter from the actual measured value of the first parameter is greater than or equal to a predetermined value, determines that the transmission scheme can be changed from the first transmission scheme to the second transmission scheme and thereby determines that the transmission efficiency can be improved, and performs processing for changing the transmission scheme so that the transmission efficiency can be improved.

2. The monitoring apparatus according to claim 1, wherein the improvement processing unit:
in order to determine whether the transmission efficiency can be improved, calculates the limiting value of the first parameter needed in the network apparatus on the receiving side, by estimating the penalty in a case where a modulation scheme serving as the transmission scheme would be changed from a first modulation scheme to a second modulation scheme whose transmission efficiency is improved from that of the first modulation scheme, and when the value obtained by subtracting the limiting value of the first parameter from the actual measured value of the first parameter is greater than or equal to the predetermined value, determines that the modulation scheme can be changed from the first modulation scheme to the second modulation scheme and thereby determines that the transmission efficiency can be improved, and performs processing for changing the modulation scheme so that the transmission efficiency can be improved.

3. The monitoring apparatus according to claim 1, wherein the improvement processing unit
calculates the limiting value of the first parameter needed in the network apparatus on the receiving side, by changing a limiting value related to an error correction scheme serving as the transmission scheme from a limiting value related to a first error correction scheme to a limiting value related to a second error correction scheme whose transmission efficiency is improved from that of the first error correction scheme, and when a value obtained by subtracting the limiting value of the first parameter from the actual measured value of the first parameter is greater than or equal to the predetermined value, determines that the error correction scheme can be changed from the first error correction scheme to the second error correction scheme.

4. The monitoring apparatus according to claim 1, wherein
the variable parameter changing unit changes the variable parameter without causing the first parameter to fall below a limiting value set not to cause communication errors.

5. The monitoring apparatus according to claim 1, wherein the variable parameter changing unit changes the variable parameter for an optical signal transmitted over a monitoring channel that does not carry a main signal.

6. The monitoring apparatus according to claim 1, wherein the estimation unit estimates a first physical factor, using the monitoring information, and estimates a first penalty, using the estimated first physical factor.

7. The monitoring apparatus according to claim 1, wherein the estimation unit estimates the penalty, using a look-up table in which the monitoring information is associated with the penalty, or a look-up table in which a physical factor obtained from the monitoring information is associated with the penalty.

8. A monitoring method comprising:
changing a variable parameter that is related to a characteristic of optical communication and is changeable for at least one of multiple network apparatuses that constitute an optical communication network transmitting optical signals by wavelength division multiplexing;

acquiring at least one piece of monitoring information related to a state of the optical communication from the at least one of the multiple network apparatuses;

estimating at least one penalty for a network apparatus on a receiving side, which receives optical signals in the optical communication, among the multiple network apparatuses, using the monitoring information;

determining whether a transmission efficiency of the optical communication network can be improved, using the estimated penalty, and, if it is determined that the transmission efficiency can be improved, performing processing for changing a transmission scheme so that the transmission efficiency can be improved, by changing the transmission scheme from a first transmission scheme to a second transmission scheme whose transmission efficiency is improved from that of the first transmission scheme;

acquiring at least an actual measured value of a first parameter of the monitoring information indicating a communication quality of an optical signal transmitted from a network apparatus on a transmitting side, which transmits the optical signals in the optical communication, among the multiple network apparatuses, to the network apparatus on the receiving side;

in order to determine whether the transmission efficiency can be improved, calculating, using the estimated penalty, a limiting value of the first parameter needed in the network apparatus on the receiving side, in a case where the transmission scheme would be changed from the first transmission scheme to the second transmission scheme; and when a value obtained by subtracting the limiting value of the first parameter from the actual measured value of the first parameter is greater than or equal to a predetermined value, determining that the transmission scheme can be changed from the first transmission scheme to the second transmission scheme and thereby determines that the transmission efficiency can be improved, and performs processing for changing the transmission scheme so that the transmission efficiency can be improved.

9. The monitoring method according to claim 8, comprising:

in order to determine whether the transmission efficiency can be improved, calculating the limiting value of the first parameter needed in the network apparatus on the receiving side, by estimating the penalty in a case where a modulation scheme serving as the transmission scheme would be changed from a first modulation scheme to a second modulation scheme whose transmission efficiency is improved from that of the first modulation scheme, and when the value obtained by subtracting the limiting value of the first parameter from the actual measured value of the first parameter is greater than or equal to the predetermined value, determining that the modulation scheme can be changed from the first modulation scheme to the second modulation scheme and thereby determines that the transmission efficiency can be improved, and performs processing for changing the modulation scheme so that the transmission efficiency can be improved.

10. The monitoring method according to claim 8, comprising:

calculating the limiting value of the first parameter needed in the network apparatus on the receiving side, by changing a limiting value related to an error correction scheme serving as the transmission scheme from a limiting value related to a first error correction scheme to a limiting value related to a second error correction scheme whose transmission efficiency is improved from that of the first error correction scheme, and when a value obtained by subtracting the limiting value of the first parameter from the actual measured value of the first parameter is greater than or equal to the predetermined value, determining that the error correction scheme can be changed from the first error correction scheme to the second error correction scheme.

11. The monitoring method according to claim 8, comprising:

changing the variable parameter without causing the first parameter to fall below a limiting value set not to cause communication errors.

12. The monitoring method according to claim 8, comprising changing the variable parameter for an optical signal transmitted over a monitoring channel that does not carry a main signal.

13. The monitoring method according to claim 8, comprising estimating a first physical factor, using the monitoring information, and estimating a first penalty, using the estimated first physical factor.

14. A non-transitory computer-readable medium containing a program that causes a computer to perform the steps of:

changing a variable parameter that is related to a characteristic of optical communication and is changeable for at least one of multiple network apparatuses that constitute an optical communication network transmitting optical signals by wavelength division multiplexing;

acquiring at least one piece of monitoring information related to a state of the optical communication from the at least one of the multiple network apparatuses;

estimating at least one penalty for a network apparatus on a receiving side, which receives optical signals in the optical communication, among the multiple network apparatuses, using the monitoring information;

determining whether a transmission efficiency of the optical communication network can be improved, using the estimated penalty, and, if it is determined that the transmission efficiency can be improved, performing processing for changing a transmission scheme so that the transmission efficiency can be improved, by changing the transmission scheme from a first transmission scheme to a second transmission scheme whose transmission efficiency is improved from that of the first transmission scheme;

acquiring at least an actual measured value of a first parameter of the monitoring information indicating a communication quality of an optical signal transmitted from a network apparatus on a transmitting side, which transmits the optical signals in the optical communication, among the multiple network apparatuses, to the network apparatus on the receiving side;

in order to determine whether the transmission efficiency can be improved, calculating, using the estimated penalty, a limiting value of the first parameter needed in the network apparatus on the receiving side, in a case where the transmission scheme would be changed from the first transmission scheme to the second transmission scheme; and when a value obtained by subtracting the limiting value of the first parameter from the actual measured value of the first parameter is greater than or equal to a predetermined value, determining that the transmission scheme can be changed from the first transmission scheme to the second transmission scheme and thereby determines that the transmission efficiency can be improved, and performs processing for changing the transmission scheme so that the transmission efficiency can be improved.

* * * * *